(12) United States Patent
Ulvr et al.

(10) Patent No.: US 6,398,106 B1
(45) Date of Patent: Jun. 4, 2002

(54) UNIQUE IDENTIFIER BAR CODE ON STAMPS AND APPARATUS AND METHOD FOR MONITORING STAMP USAGE WITH IDENTIFIER BARS

(75) Inventors: Joseph Frank Ulvr, Carp; Barbara Lynn Critchley, Gloucester, both of (CA)

(73) Assignee: Canada Post Corporation, Ottawa (CA)

( * ) Notice: Subject to any disclaimer, the term of this patent is extended or adjusted under 35 U.S.C. 154(b) by 0 days.

(21) Appl. No.: 09/707,192

(22) Filed: Nov. 6, 2000

Related U.S. Application Data

(62) Division of application No. 09/258,665, filed on Feb. 26, 1999.

(51) Int. Cl.[7] .............................................. G06F 17/00
(52) U.S. Cl. ...................................... 235/375; 235/380
(58) Field of Search ................................. 235/375, 380, 235/385, 383, 384, 381

(56) References Cited

U.S. PATENT DOCUMENTS

| | | |
|---|---|---|
| 5,064,222 A | 11/1991 | Legault |
| 5,420,403 A * | 5/1995 | Allum et al. ................ 235/375 |
| 5,929,415 A * | 7/1999 | Berson ........................ 235/382 |
| 5,943,432 A * | 8/1999 | Gilmore et al. ............. 382/101 |

OTHER PUBLICATIONS

Information Based Indicia Program (IBIP) Indicium Specification, United States Postal Service, Jun. 13, 1996.

* cited by examiner

Primary Examiner—Karl D. Frech
(74) Attorney, Agent, or Firm—Clifford W. Browning; Woodard, Emhardt, Naughton, Moriarty & McNett

(57) ABSTRACT

A system for identifying mail pieces with stolen stamps is provided in which a database of unique identifiers of stolen stamps is maintained, and in which the unique identifiers of stamps on originating mail pieces are compared to the unique identifiers in the database and with the mail piece being segregated if one of the stamps has been stolen. A method of preventing stamp reuse is also provided in which at an originating mail processing apparatus unique identifier bar codes on stamps are read and sent to a national circulation database together with an identification tag applied to the mail piece and information identifying a destination mail processing plant. The national circulation database makes a determination of whether the stamp has been reused, and if so sends a message to the destination mail processing plant which segregates the mail pieces when it arrives.

16 Claims, 13 Drawing Sheets

| STAMP IDENTIFIER | ID TAG | DESTINATION IDENTIFIER | DATE |

UNIQUE IDENTIFIER BAR CODE ON STAMPS AND APPARATUS AND METHOD FOR MONITORING STAMP USAGE WITH IDENTIFIER BARS

This appl. is a divisional of U.S. appl. Ser. No. 09/258,665, filed Feb. 26, 1999.

FIELD OF THE INVENTION

The invention relates to stamps, such as postage stamps, and also to methods, systems and machines for tracking the usage of such stamps

BACKGROUND OF THE INVENTION

Stamps provide a common vehicle used in the collection of payment for the delivery of deliverable items. For example, postage stamps are used to pay for postal delivery service of mail items. While the value of a given conventional postage stamp can easily be determined from a visual inspection, current systems for processing mail are incapable of automatically determining whether the proper amount of postage has been applied with the result that postal administrations are incapable of identifying mail pieces with short paid postage in an automated processing stream. Additional problems with conventional stamps include the re-use of cancelled postage stamps, the use of postage stamps which have been stolen, the use of postage stamps which have been chemically washed to remove cancellation marks, and the use of postage stamps which have been fraudulently manufactured. The above mis-uses of postage stamps cost postal administrations millions of dollars annually in lost revenue.

Various proposals have been made for dealing with this problem. Colour imaging of postage stamps and the analysis of colours and patterns has been proposed for the identification of specific postage stamps and the calculation of short paid postage. This methodology is very expensive due to the requirement for a colour camera on mail processing machines. It is also unreliable due to the complexity of the individual patterns which must be recognized. Furthermore, only a limited number of patterns can be stored and accessed during real time processing.

The use of connotative inks in postage stamp manufacture and postage stamp cancellation has been investigated as a means to permanently alter the colour of a postage stamp after cancellation to eliminate the potential for washing and re-using a postage stamp. However, connotative inks are expensive and the manufacture of stamps in this manner is more difficult.

No methods have been developed for the detection and isolation of stolen postage stamps. The detection of counterfeit stamps is dependent on the visual examination of the postage stamps' paper, perforations, colour and fluorescence. Visual detection is inefficient and ineffective as only a small sample can be examined.

Metered marks are also subject to fraud. To reduce this fraud and to provide a convenient alternative to postage stamps for small office/home office mailers, the United States Postal Service has developed a methodology for PC postage. For PC postage, the United States Postal Service is investigating the use of the PDF 417 bar code for application to the exterior of envelopes by the printer of the envelopes. A chip or on-line Internet account is debited each time the bar code indicia is printed. Unfortunately, the PDF 417 bar code has very low efficiency in terms of data content per unit area. This is despite the fact that the smallest element in the PDF 417 bar code is very small, in fact smaller than that readable by today's postal industry optical character recognition (OCR) packages included in many existing mail processing machines which have 200 dpi resolution. This means that hand-held scanners are required to read the PDP 417 bar code. Furthermore, the PDF 417 bar codes are large and are not aesthetically pleasing. The systems employed to monitor PC postage usage through these bar codes takes over a day to perform verification and as such cannot be used in real time.

At meetings of the Universal Postal Union Technical Standards Board, the United States Postal Service discussed their information-based indicia program based on the use of the PDF 417 bar code symbology as a replacement for a meter impression, and Canada Post proposed the use of Data Matrix or Aztec code symbologies for this purpose. Mechanisms for using such bar codes to verify postage or detect fraud in real time have yet to be proposed.

While it has been proposed to include unique identifiers on PC postage, there have never been postage stamps which include any sort of unique identifier. Furthermore, there are not any existing systems capable of identifying mail pieces which are short paid, or postage stamps which have been stolen or reused.

SUMMARY OF THE INVENTION

It is an object of the invention to obviate or mitigate one or more of the above identified disadvantages.

According to a first broad aspect, the invention provides a postage stamp comprising a first area containing postage stamp artwork; and a second area containing an identifier bar code for the stamp.

According to a second broad aspect, the invention provides a deliverable item processing apparatus for processing a deliverable item having destination information and one or more identifier bar codes each containing a value, the apparatus comprising an image capture device for taking one or more images of the deliverable item which include at least the identifier bar codes and the destination information; a processing and control block for processing the images so as to determine the destination information and the values contained in the identifier bar codes, for accumulating a total of the values contained in the identifier bar codes applied to the deliverable, item, for determining a required value for the deliverable item on the basis of the destination information, and for determining it the total is as great as the required value.

According to a third broad aspect, the invention provides a deliverable item processing apparatus for processing a deliverable item having destination information and one or more two-dimensional unique identifier bar codes each representing a unique identifier, the apparatus comprising an image capture device for taking one or more images of the deliverable item which include at least the unique identifier bar codes and the destination information; an identification tag printer for applying a unique identification tag to each deliverable item processed by the deliverable item processing apparatus; a processing and control system for processing the images so as to determine a destination identifier from the destination information and from the unique identifier bar codes the unique identifiers, and for creating a record for each unique identifier bar code containing the unique identifier, the identification tag and the destination identifier.

According to a fourth broad aspect, the invention provides a deliverable item processing apparatus for processing a deliverable item having an identification tag, the apparatus comprising an identification tag capture device for reading the identification tag; a processing and control block for maintaining a list of identification tags on the basis of an input received from a remote source, for comparing the identification tag with the list of identification tags, and if there is a match, diverting the deliverable item for special processing.

According to a fifth broad aspect, the invention provides a method of controlling data for use by deliverable item processing apparatuses, the method comprising storing a plurality of records each having fields for an identification tag and a unique identifier; receiving from one of said deliverable item processing apparatuses a destination identifier, a received identification tag of a deliverable item which has been processed by said deliverable item processing apparatus and a received unique identifier; looking up the record containing the received unique identifier; if there is no stored identification tag in the record, adding the received identification tag to the record; if there is a stored identification tag in the record, comparing the stored identification tag to the received identification tag; if there is no record for the unique identifier, or if there is a mismatch between the stored identification tag and the received identification tag, sending the received identification tag to a destination identified by the destination identifier.

According to a sixth broad aspect, the invention provides a deliverable item processing apparatus for processing a deliverable item having one or more stamps with unique identifier bar codes each containing a unique identifier, the apparatus comprising memory for storing a list of unique identifiers for stamps which have been identified as stolen; an image capture device for taking one or more images of the deliverable item which include at least the unique identifier bar codes; a processing and control block for determining from the unique identifier bar codes in the images the unique identifiers of the stamps, and for comparing these to the stored unique identifiers, and if there is a match, diverting the deliverable item for special processing.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

According to an embodiment of the invention, an improved postage stamp is provided which includes a two-dimensional unique identifier bar code. As described in detail below, the unique identifier bar code uniquely identifies the postage stamp and permits the elimination of most or all of the fraudulent postage stamp usages outlined above. The unique identifier bar code is readable preferably by mail processing machines which use cameras for optical character recognition.

Figure 1A:
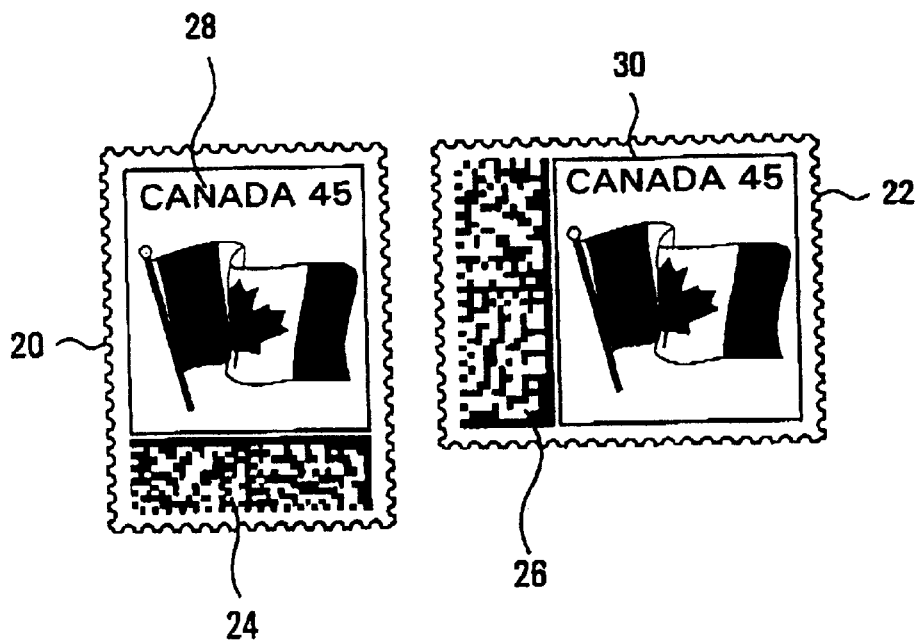
FIG. 1A is a schematic illustration of two postage stamps according to an embodiment of the invention.

Referring firstly to FIG. 1A, two schematic replicas of such improved postage stamps according to the invention are shown and are generally indicated by 20,22. Each stamp 20,22 includes a two-dimensional bar code portion 24,26, and an artwork portion 28,30. The artwork portions 28,30 include an alphanumeric designation of the country, in this case "Canada", and of the postage value of the particular postage stamp, in this case "45".

The bar code portions 24,26 may use any existing or future bar code symbology satisfying a number of constraints. Firstly, the bar code symbology must permit the expression of a sufficient amount of information about the postage stamp, and preferably in a reasonable amount of postage stamp real estate. In other words, the unique identifier bar codes must not be too large.

Preferably, the bar code symbology is readable with existing mail processing machines. The majority of mail processing machines in the world have cameras with a resolution of 200 dots per inch. Based on this requirement, the smallest element in the unique identifier bar code should be at least 0.3 mm in size, and more preferably, each element is at least 0.5 mm in size to ensure reliable reading.

Each two-dimensional unique identifier bar code is encoded with information that makes it a unique identifier for the postage stamp of which it forms a part. Preferably, it contains several data elements as summarized in the following table where example values for the data elements are also provided:

| Data Element | Bytes | Example |
| --- | --- | --- |
| Delivery Service Provider Identifier | 2 | JO |
| Country Identifier | 2 | CA |
| Postage Stamp Value | 2 | 0046 |
| Postage Stamp Design # | 2 | 0105 |
| Date of Printing (yymm) | 2 | 9902 |
| Printing Company # | 2 | 02 |
| Serial Number | 4 | 1054345 |
| Data Security (encryption) | 8 | Binary String |
| Total | 22 | |

To distinguish the two-dimensional unique identifier bar codes created for use by delivery service providers from other two-dimensional bar codes which may appear on a mail piece, a delivery service provider identifier data element is preferably included in the data. To provide the flexibility for use by different countries, a country identifier is added. The postage stamp value is required to allow a determination of whether a mail piece hag been short paid as described in detail below. The postage stamp value, stamp design number, date of printing, and printing company number identify manufacturing batches with serial numbers assigned within each batch to uniquely identify each postage stamp. The use of batch criteria permits fast searching of databases. Any one or a combination of these or other fields which allows a unique identification of a postage stamp will be referred to as a "unique identifier". This unique identifier might for example include all of the following fields: the postage stamp value, stamp design number, date of printing, printing company and serial number.

To accommodate the required data in an OCR readable bar code in the real estate available with the smallest size of postage stamp requires the use of a two-dimensional bar code. To guarantee a high bar code read rate with a low error rate, error correction such as Reed-Solomon coding can be incorporated in the unique identifier bar code. To minimize damage to the unique identifier bar code and maximize reading during mail processing of a black ink unique identifier bar code, it is desirable to locate the unique identifier bar code towards the bottom (as in the first example 20) or to the left-hand side (as in the second example 22) of the postage stamp.

Figure 1B:
FIG. 1B is an illustration of two possible bar code symbologies for use with the postage stamps of FIG. 1A.

Two known bar code symbologies with the required properties are illustrated in FIG. 1B and consist of the Aztec Code symbology 27 and the Data Matrix symbology 29. The Aztec symbology is described in AIM (American Industry Manufacturers) Standard ISS (International Symbology Specification) Aztec (10/97), and the Data Matrix symbology is described in AIM Standard ISS Data Matrix (12/96 V1.01). The Data Matrix and Aztec symbologies both have a net area efficiency of approximately 50%.

Figure 2:
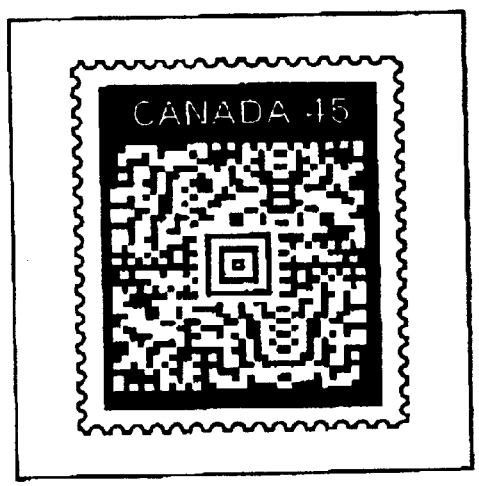
FIG. 2 is a schematic illustration of another postage stamp according to an embodiment of the invention.

Preferably the unique identifier bar code is printed in black and white or in colours with sufficient print contrast ratio for OCR reading and is printed in a separate portion of the postage stamp from the artwork. Another option is to print the two-dimensional unique identifier bar code in invisible ink (fluorescent or infrared) partially or completely overlapping the artwork of the postage stamp. This option would require the installation of an additional camera on each mail processing machine. An example of this is shown in FIG. 2 where the unique identifier bar code is illustrated in white, but it is to be understood that the unique identifier bar code would be printed using invisible ink meaning the artwork would be completely visible.

While the above described embodiment has focused on postage stamps which would be sold by postal administrations, it is to be understood that any stamps including such unique identifier bar codes could be put to use by any delivery service provider.

Figure 3:
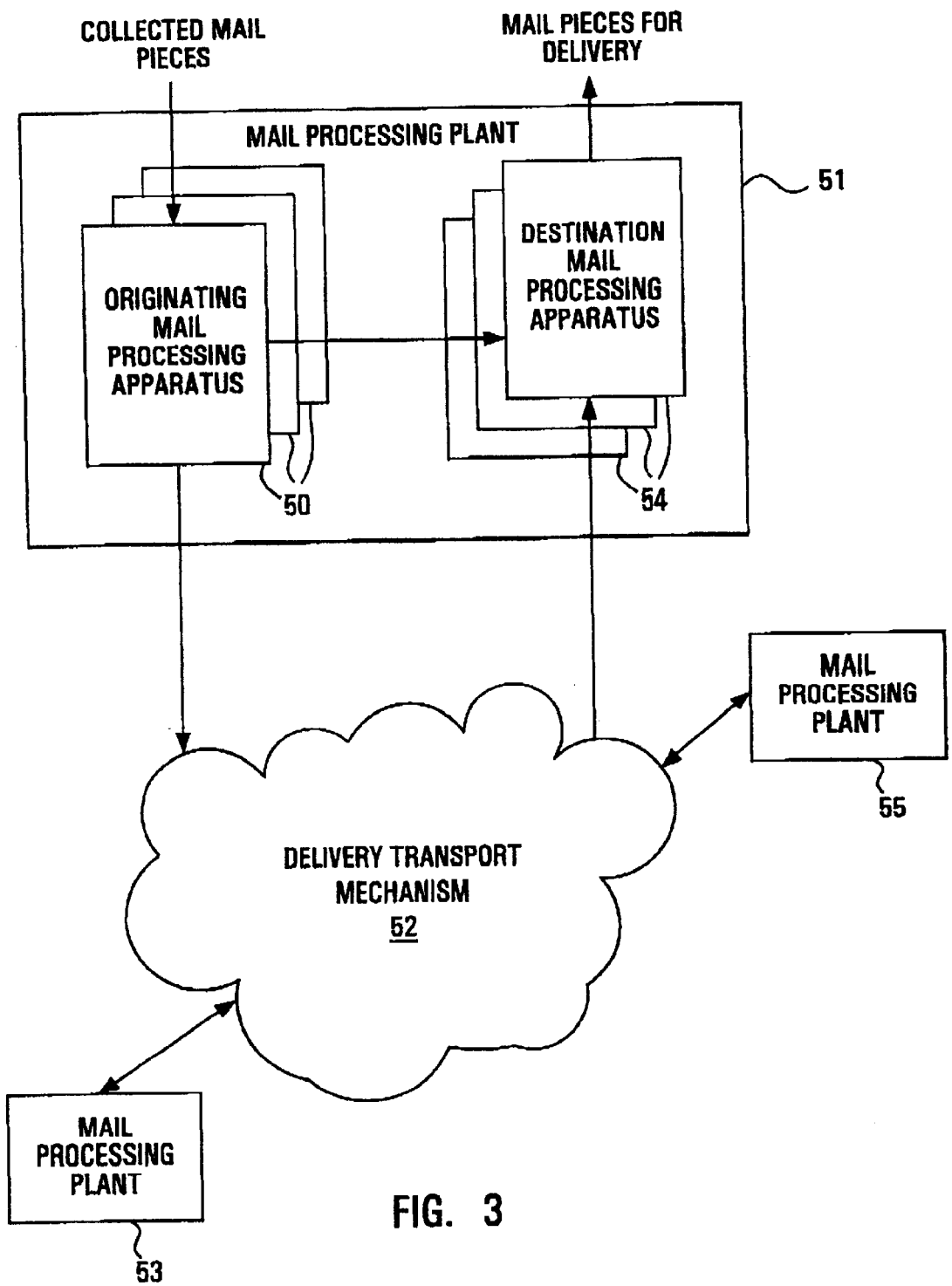
FIG. 3 is a block diagram of a postal service provider system.

A very general postal service provider system is shown schematically in FIG. 3. The system includes a number (three shown) of mail processing plants 51,53,55 "connected to each other" through a delivery transport mechanism 52 which is illustrated by a cloud. The mail processing plants 51,53,55 are typically disparately geographically located, for example in different cities. Each processing plant 51,53, 55 contains one or more originating mail processing apparatuses by which mail pieces are first processed by the system and/or one or more destination mail processing apparatuses which perform output processing on mail pieces. The details of mail processing plant 51 are shown by way of example to include three originating mail processing apparatuses 50 and three destination mail processing apparatuses 54. The delivery transport mechanism 52 is any mechanism or combination of mechanisms which provides for the physical delivery of mail pieces between the mail processing plants 51,53,55.

Figure 4:
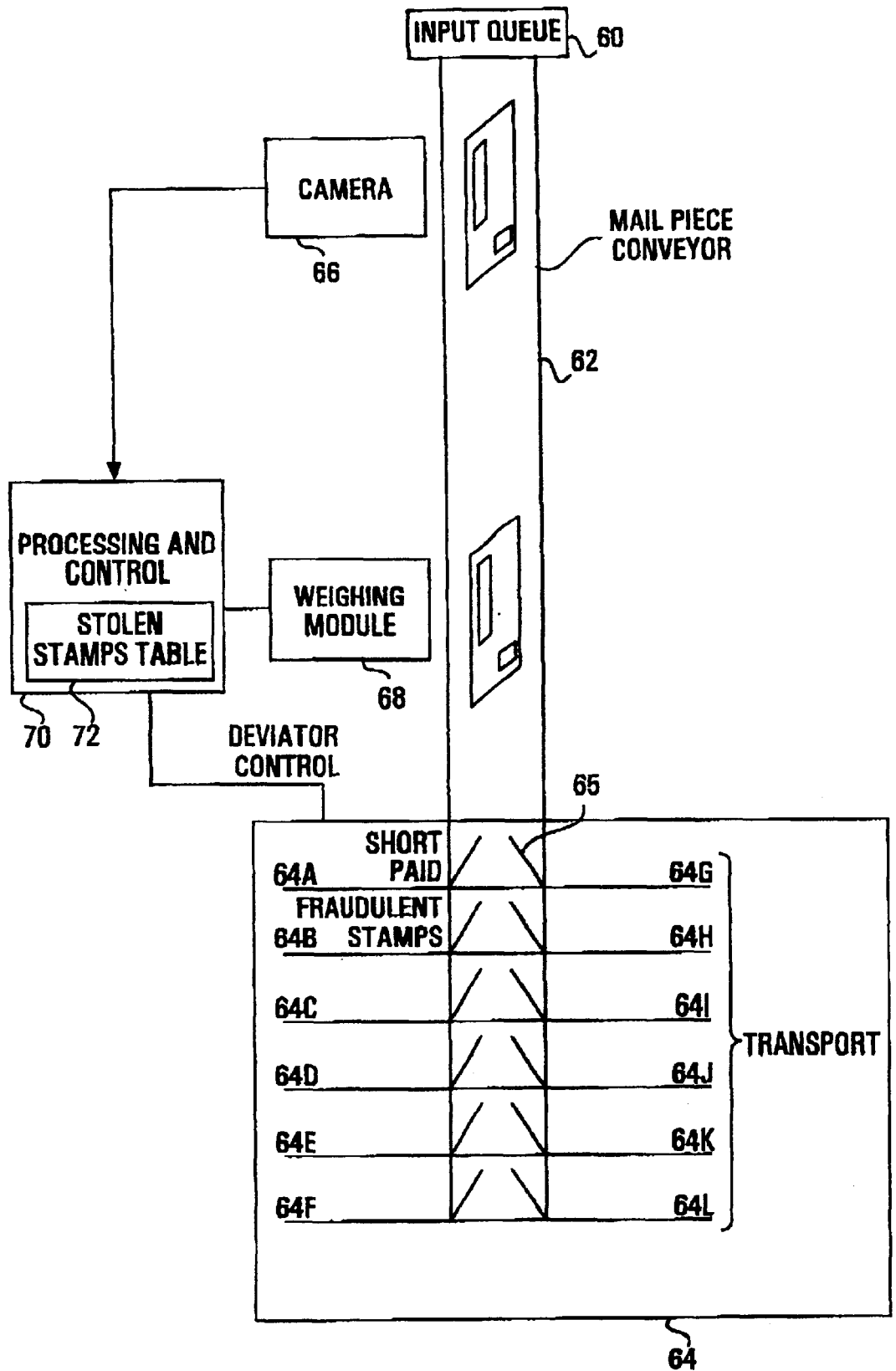
FIG. 4 is a block diagram of a mail processing apparatus according to an embodiment of the invention.

A mail processing apparatus according to an embodiment of the invention is depicted in block diagram form in FIG. 4. While this embodiment could be used as a destination mail processing machine, it is preferably implemented as an originating mail processing apparatus for use in a system such as depicted in FIG. 3 for example. This embodiment allows the detection and extraction of short paid mail pieces This apparatus in designed to process mail pieces which have destination information such as an address, and to which one or more of the above described novel postage stamps have been affixed. The apparatus has an input queue 60 into which mail pieces for processing are deposited. The input queue 60 feeds the mail pieces onto a mail piece conveyor 62 which is typically a series of belts designed to transport mail pieces through the mail processing apparatus to a multi-bin stacker generally indicated by 64. The multi-bin stacker 64 has a plurality of bins 64A, 64B, 64C, 64D, 64E, 64F, 64G, 64H, 64I, 64J, 64K, 64L into which mail pieces can be directed by deviators 65 (12 shown). Along the length of the mail piece conveyor 62 (which need not be a straight line) various devices are placed to perform actions upon the mail pieces as they pass by. A camera 66 is provided for taking and digitizing an image of the front surface of the mail piece, the assumption being that the mail pieces have been previously faced such that the destination information and stamps are on the front surface. There is a weighing module 68 for measuring the weight of the mail pieces. There is a processing and control block generally indicated by 70 which is intended to represent most of the processing and control functionality of the mail processing machine. This may be implemented in one or a series of computer platforms with one or multiple processors. The processing and control block is connected to receive the digitized images taken by the camera 66 and the weights measured by the weighing module 68. It is also connected to control the deviators 65 forming part of the multi-bin stacker 64 so as to be able to precisely control into which bin a given mail piece is to be diverted. While the camera 66 preferably takes an image of the entire front surface of the mail piece, it (or a combination of cameras) must at least take one or more images which collectively include the destination information and the stamps.

The processing and control block 70 includes optical character recognition software for analyzing digitized images received from the camera 66, and more particularly for processing the unique identifier bar code on each stamp on the mail piece, and for determining the destination information. The processor and control block 70 also includes functionality which allows a determination of a required postage for various destinations for a given weight of a mail piece.

Figure 5:
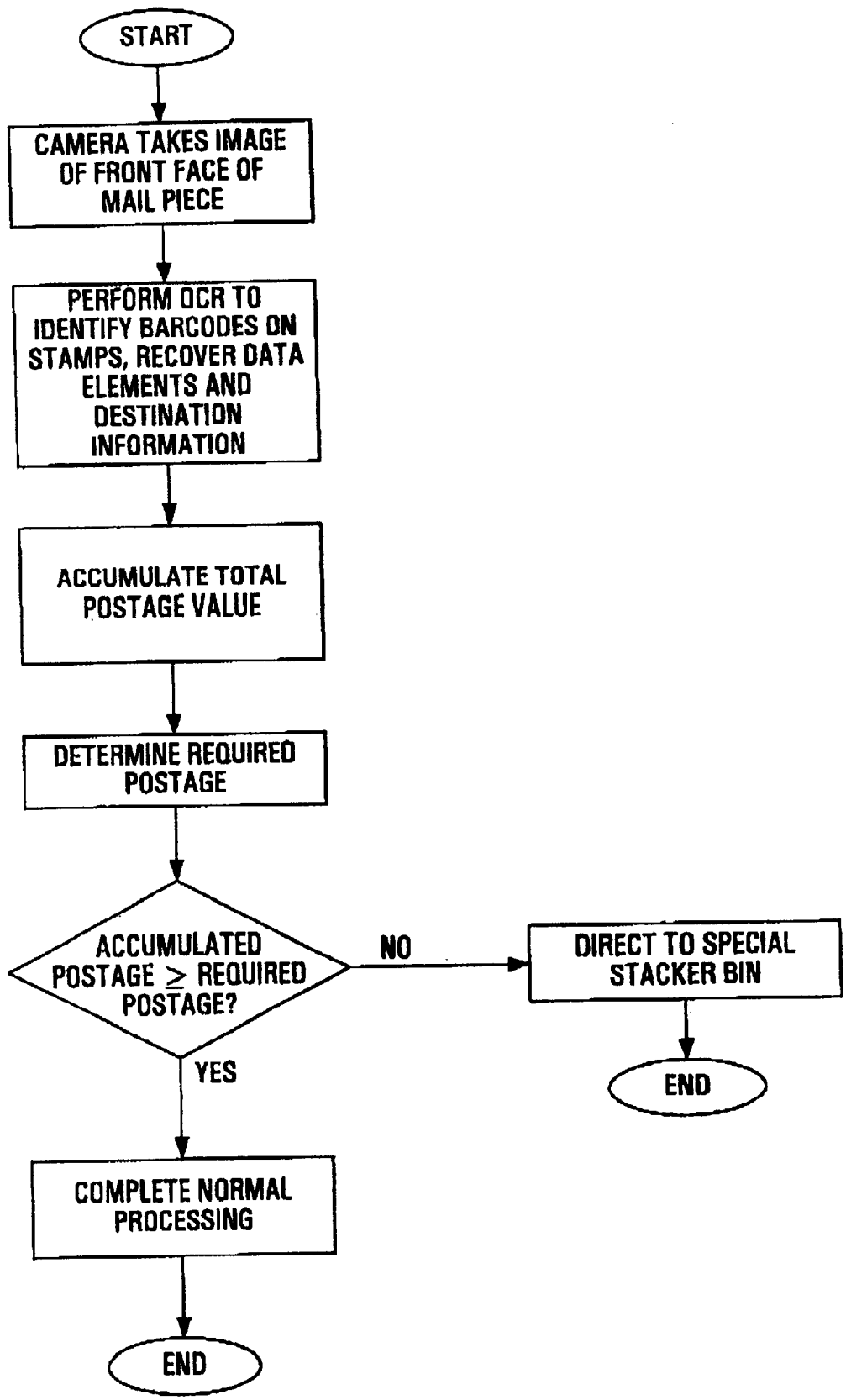
FIG. 5 is a flowchart of a method used by the mail processing apparatus of FIG. 4 to identify short paid postage.

The steps performed by the mail processing apparatus of FIG. 4 will now be described with reference to the flowchart of FIG. 5. To begin, the camera 66 takes an image of the front surface of the mail piece, digitizes this and passes it to the processing and control block 70. The processing and control block 70 performs character and word recognition to identify the destination information and to find and decode the unique identifier bar code on each stamp and recover the data elements represented by the unique identifier bar code. There may be several stamps. Next, the processing and control block 70 accumulates a sum of the postage values of the postage stamps on the mail piece. The processing and control block 70 then determines a required postage based on the destination information and the weight.

Next, a comparison of the required postage with the total cumulative stamp value is made. If there is a postage shortfall, this fact is identified in real time, and the processing and control block 70 controls the stacker deviators 65 such that the mail piece is diverted to a bin which has been allocated to receive short paid mail, for example bin 64A which is labelled "short paid". If there is sufficient postage, then normal processing of the mail piece is completed, and the mail piece is diverted to a bin for transport, for example one of bins 64G, 64H, 64I, 64J, 64K, 64L.

Figure 6:
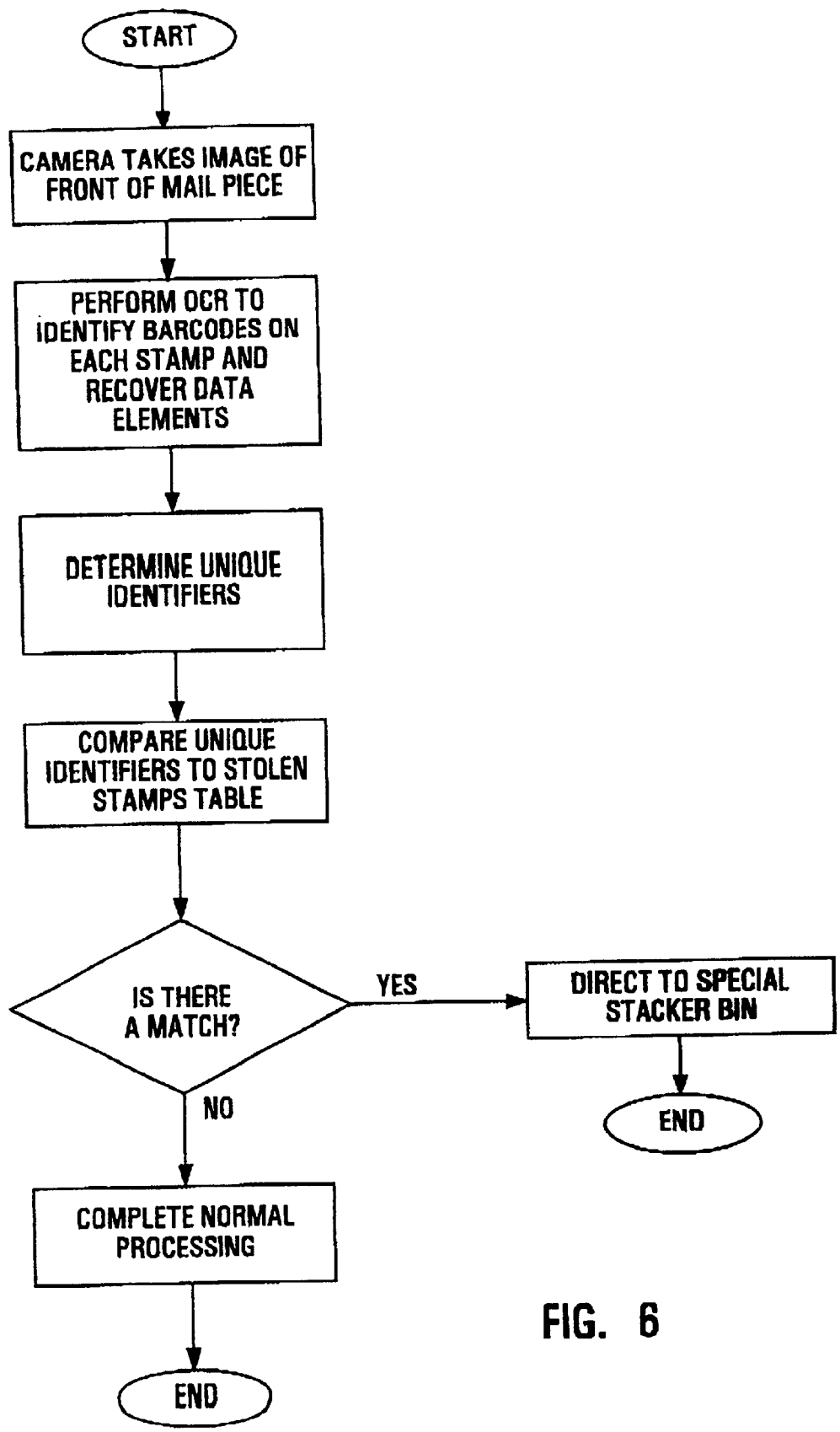
FIG. 6 is a flowchart of a method used by the mail processing apparatus of FIG. 4 to identify stolen stamps.

In another embodiment of the invention, a mail processing apparatus is provided which can detect stolen stamps. Referring again to FIG. 4, in this embodiment, a stolen stamps table 72 either forming part of or accessible to the processing and control block 70 is provided for storing unique identifiers of stamps which have been stolen. A flowchart for this embodiment is shown in FIG. 6. As before, the camera 66 takes an image of the front surface of the mail piece, digitizes it and passes the image to the processing and control block 70. The processing and control block 70 performs recognition and decoding of the unique identifier bar code on each stamp on a given mail piece to recover the data elements and to determine a unique identifier for each stamp. Next, the unique identifier on each postage stamp is compared to the identifiers in the stolen stamps table 72 in real time by the processing and control block 70. If there is a match, then the mail piece is directed to a particular bin selected for mail pieces with fraudulent stamps, for example, bin 64B which is labelled "fraudulent stamps".

Figure 7:
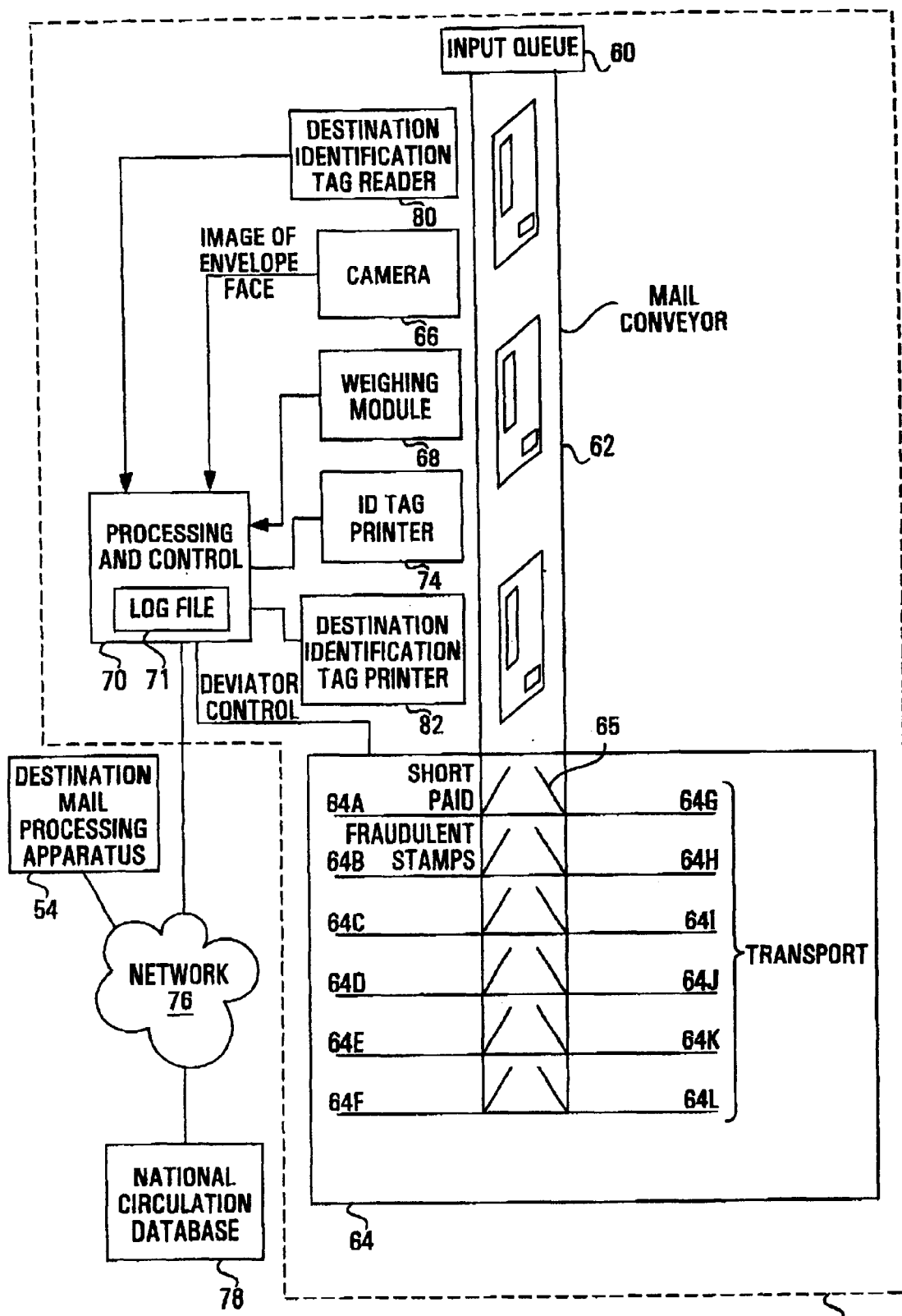
FIG. 7 is a block diagram of a mail processing system according to an embodiment of the invention showing details of an originating mail processing apparatus.
Figure 8:
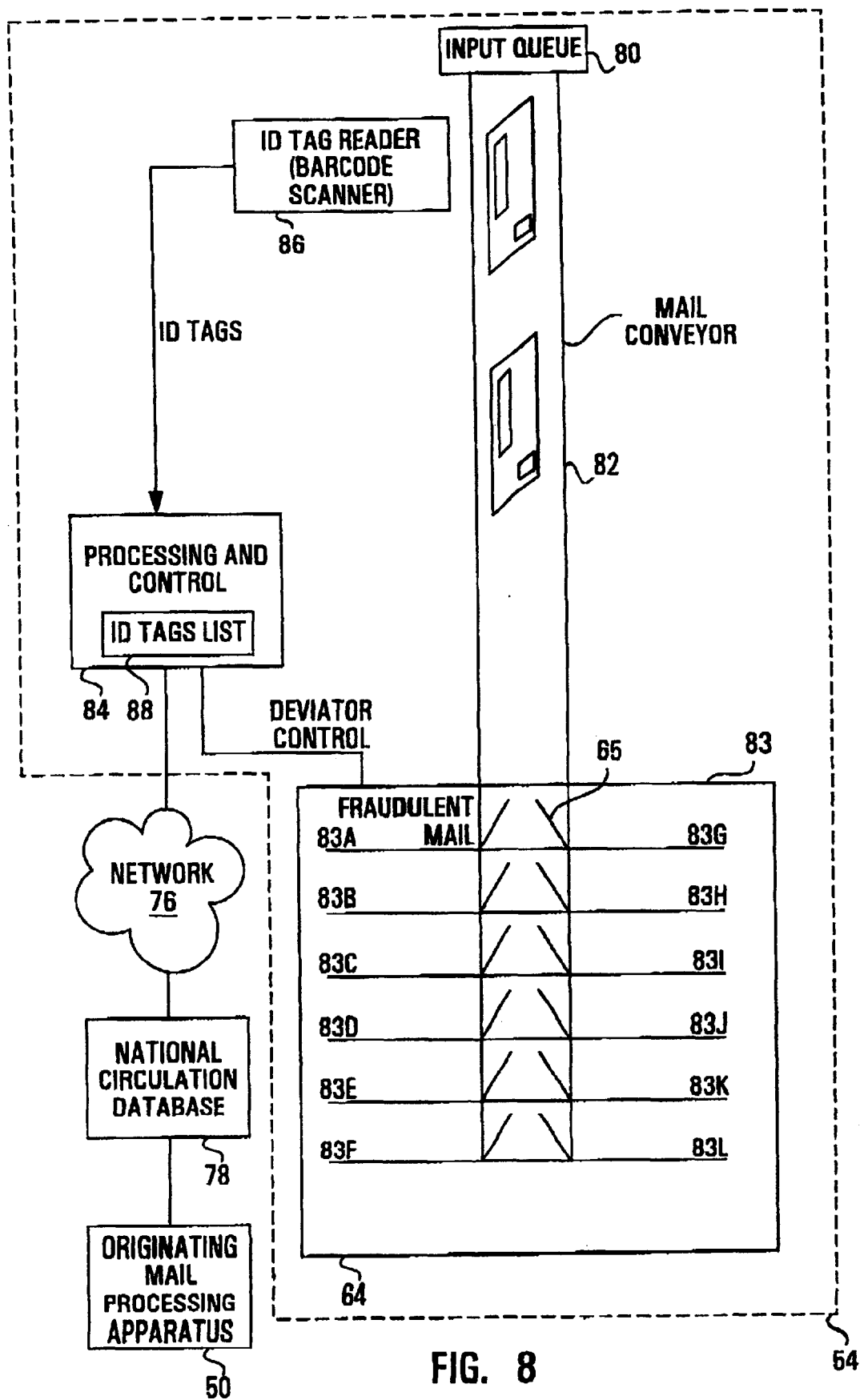
FIG. 8 is a block diagram of the mail processing system of FIG. 7 showing details of a destination mail processing apparatus.

Referring now to FIGS. 7 to 13, in another embodiment of the invention, systems and methods for preventing the fraudulent reuse of a stamp are provided. FIG. 7 is a view of a system according to the invention showing the details of an originating mail processing apparatus 50, and FIG. 8 is a view of the same system showing the details of a destination mail processing apparatus 54. Although not shown, it is of course assumed that the originating mail processing apparatus 50 and the destination mail processing apparatus 54 each interface to a delivery transport mechanism (52 of FIG. 3). In this embodiment, each originating mail processing apparatus (50 of FIG. 3) is equipped with a mail identification tag printer 74 capable of printing a bar code in fluorescent ink on the back of the mail piece which uniquely identifies the mail piece. Such identification tag printers are well known in the U.S. and Canadian postal systems for example. In addition, the originating mail processing apparatus is connected through a network 76 to a national circulation database 78 (more generally some sort of a "remote depository").

Preferably, the originating mail processing apparatus also has a destination identification tag reader 80, and a destination identification tag printer 82. In such apparatuses, the first time a mail piece is processed by an originating mail processing machine, the destination information is processed using optical character recognition, and a destination identifier is determined. This destination identifier might be a postal code or a zip code for example. The destination identification tag printer 82 then prints a destination identification tag determined from the destination identifier on the mail piece in the form of a fluorescent bar code for example, and all subsequent routing of the mail piece is performed on the basis of the destination identifier and/or the destination identification tag. This avoids the need for downstream mail processing apparatuses to reprocess the destination information. The destination identification tag reader 80 is provided to identify mail pieces which have already been processed by an originating mail processing machine. This will occur for example when a mail piece is incorrectly addressed and the incorrect receiver puts the mail piece back into the system for reprocessing. This is standard technology in mail processing and delivery and will not be discussed in further detail here. This is described simply to point out that the destination identifiers already used in the routing of mail may also be used as destination identifiers for the purposes described in detail below, although other forms of destination identifiers may be alternatively used.

The national circulation database 78 contains a table of all stamps which are in circulation. Information is stored in the national circulation database 78 in the form of records such as illustrated by way of example in FIG. 9. In this example each record has four fields, namely a unique identifier field for storing the unique identifier included in the unique identifier bar code of each stamp, an identification tag field for storing a corresponding identification tag which has been applied to a given mail pieces a destination identifier field for identifying a destination mail processing plant and a date field for identifying the date that the identification tag and destination identifier were input to the database.

Referring now to FIG. 8, the destination mail processing apparatus 54 is typically much simpler than the originating mail processing apparatus 50 because destination information processing has already been done. As before, the destination mail processing apparatus 54 has an input queue 80, a mail conveyor 82, a multi-bin stacker 83, with stacker bins 83A–83L under control of a processing and control block 84. In addition, there is an identification tag reader 86 for reading the identification tag of a mail piece applied by an originating mail processing apparatus 50. The processing and control block 84 has, or has access to, an identification tags list 88, the purpose of which will be described below.

Figures 9, 10:
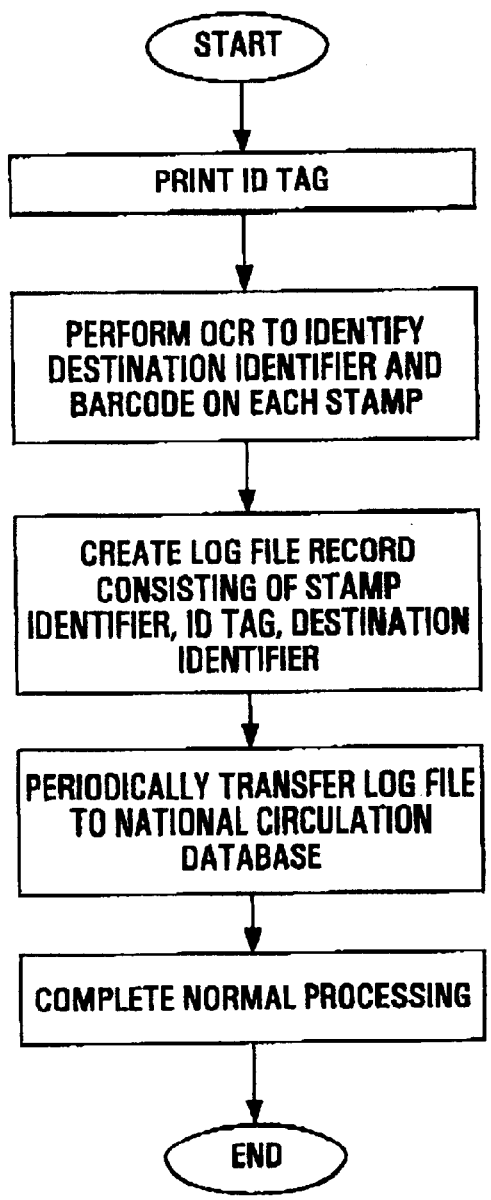
FIG. 9 is an example record in the national circulation database of FIGS. 7 and 8.
FIG. 10 is a flowchart of a method used by the originating mail processing apparatus of FIGS. 7 and 8 to prevent the fraudulent use of stamps.

FIGS. 10, 11 and 12 are flowcharts of the steps performed by the originating mail processing apparatus 50, the national circulation database 78 and the destination mail processing apparatus 54 respectively. Referring firstly to FIG. 10, when a mail piece is processed by an originating mail processing apparatus 50, i.e. the first time it is processed by any machine, the mail identification tag printer 74 prints an identification tag which uniquely identifies the mail piece in fluorescent ink on the back of the envelope. This might be a bar code an example of which is given in FIG. 13.

Next, the camera 66 takes an image of the front surface of the mail piece and passed this to the processing and control block 70 which determines the unique identifier bar code data elements on all the stamps on the mail piece, and the destination identifier from the destination information. In particular, the unique identifiers are determined. For each stamp, a record in a log file 71 is created consisting of the unique identifier, the identification tag and the destination identifier. These records are transferred periodically to the national circulation database 78 through the network 76. This completes the normal processing of that mail piece by the originating mail processing machine.

Figure 11A:
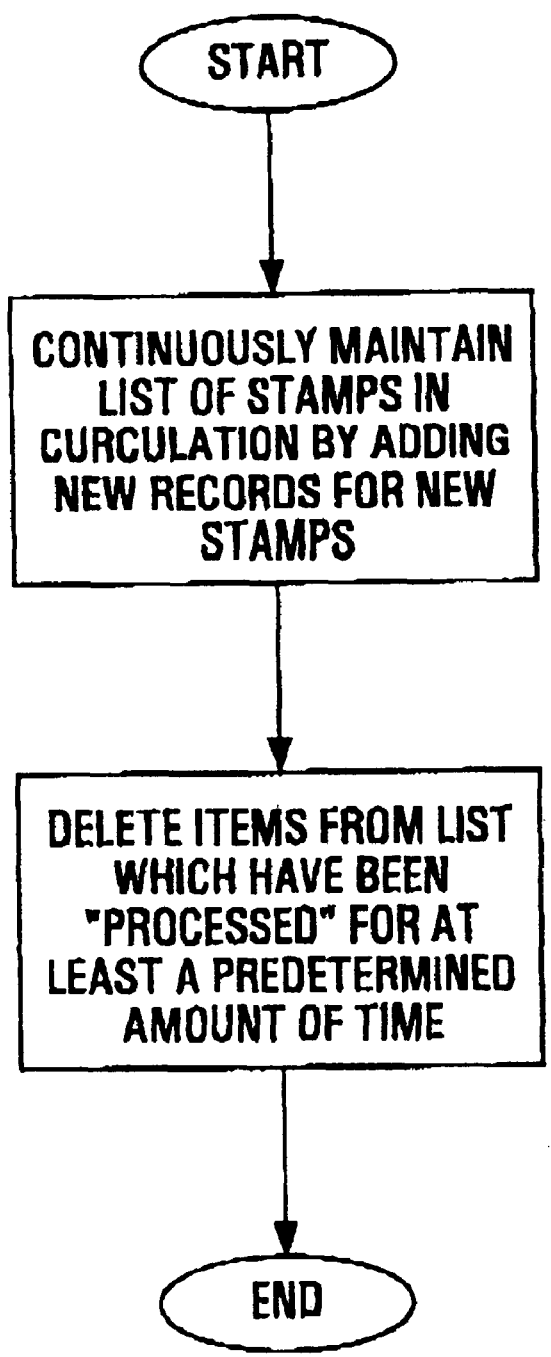
FIGS. 11A and 11B are flowcharts of methods used by the national circulation database of FIGS. 7 and 8 to prevent fraudulent use of stamps.

Referring now to FIG. 11A, this is a flowchart of the process by which the national circulation database 78 maintains the list of stamps which are in circulation. This simply consists of adding new records to the database for new stamps, and subsequently deleting records from the list which have been "processed" for at least a predetermined amount of time. The date field in each national circulation database record can be used to determine how long it has been since a particular stamp was initially processed by any mail processing machine. After a predetermined period has elapsed after the date entered in the record (i.e. a predetermined time has elapsed since the corresponding stamp was processed by an originating mail processing machine), the record can be deleted from the national circulation database, the assumption being that the mail piece has reached its destination by that time.

Figure 11B:
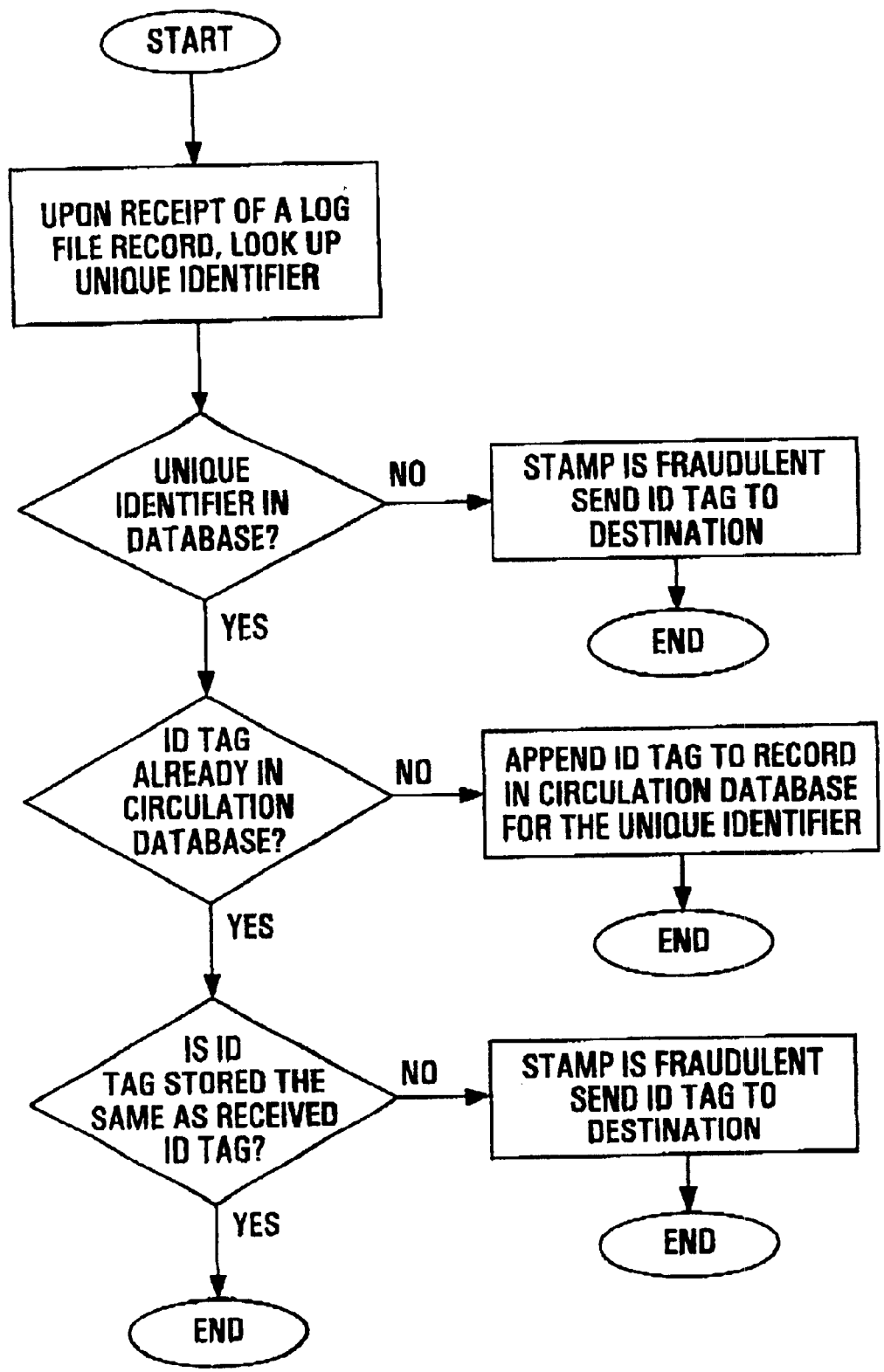

Referring next to FIG. 11B, the process implemented by the national circulation database 18 each time it receives a log file record from an originating mail processing apparatus 50 consists of first looking up the record in the national circulation database for the unique identifier contained in the log file record. If the unique identifier is not in the database then it is assumed that the stamp is fraudulent. A message is sent to the mail plant identified by the destination identifier containing the identification tag contained in the log file record. This ends the processing of the record by the national circulation database 78. In the case that the unique identifier is in the database, the record in the database is checked to ascertain whether an identification tag has already been added to that stamp's record. If not then the identification tag, the destination identifier, and date are added to the record in the circulation database and the processing of that record ends. Alternatively, if the identification tag is already in the circulation database then the stored identification tag is compared to that received in the log file record. If there is a mismatch between the identification tags then once again the stamp has been fraudulently used. This is dealt with in the same manner as above, namely by sending a message containing the identification tag to the destination. As discussed below regarding the mail processing apparatus at the destination, mail pieces identified as being fraudulent can be extracted for sortation to a special stacker bin.

Figure 12A:
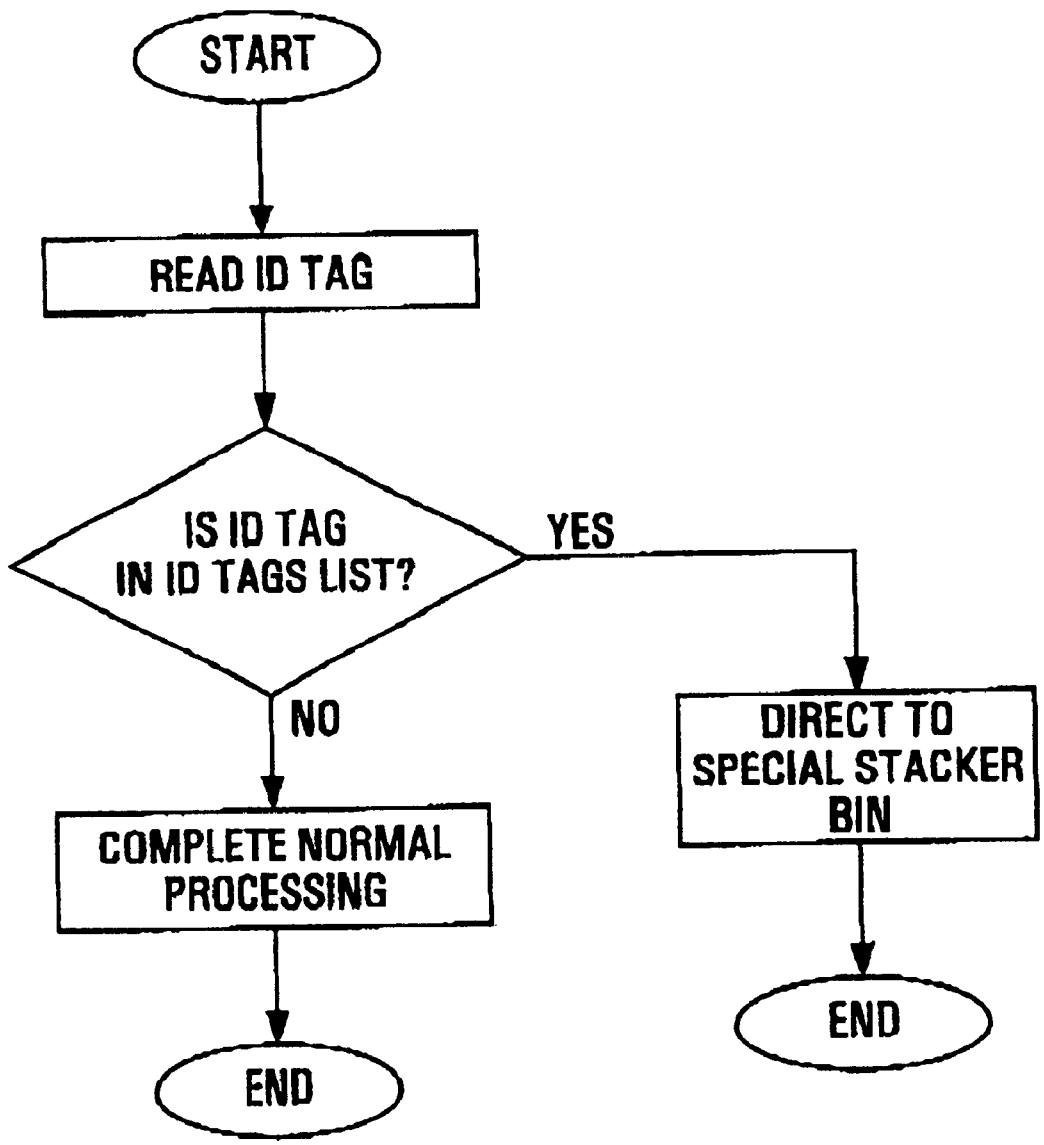
FIGS. 12A and 12B are flowcharts of methods used by the destination mail processing apparatus of FIGS. 7 and 8 to prevent the fraudulent use of stamps.

Referring next to FIG. 12A the processing performed at the destination mail processing apparatus 54 will be described. The destination mail processing apparatus for a given mail piece will be any destination mail processing apparatus in the mail processing plant identified by the destination identifier. First, the identification tag of a mail piece being processed is read using the identification tag reader 86. The identification tag is then compared to the identification tags stored in the identification tags list 88 maintained by that destination mail processing apparatus 54 as described below. If the identification tag is in the identification tags list 88 then there has been fraudulent misuse of the stamps, and the mail piece is directed to a special bin in the multi-bin stacker 83 for example, bin 83A labelled "fraudulent mail", In the event that the identification tag is not in the identification tags list 88 then normal processing of the mail piece is completed.

Figure 12B:
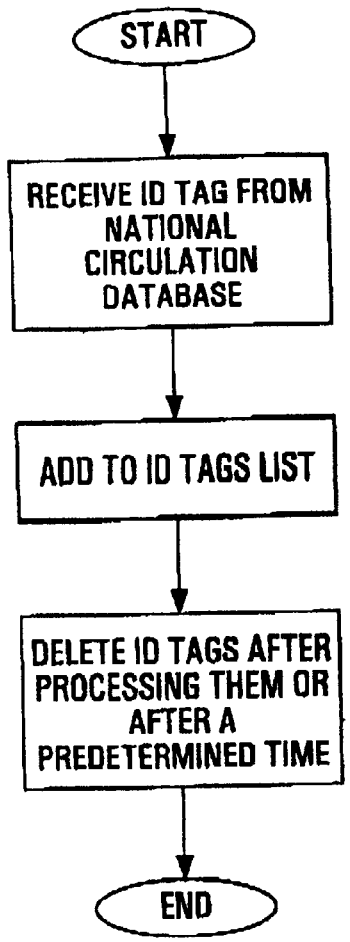
Figure 13:
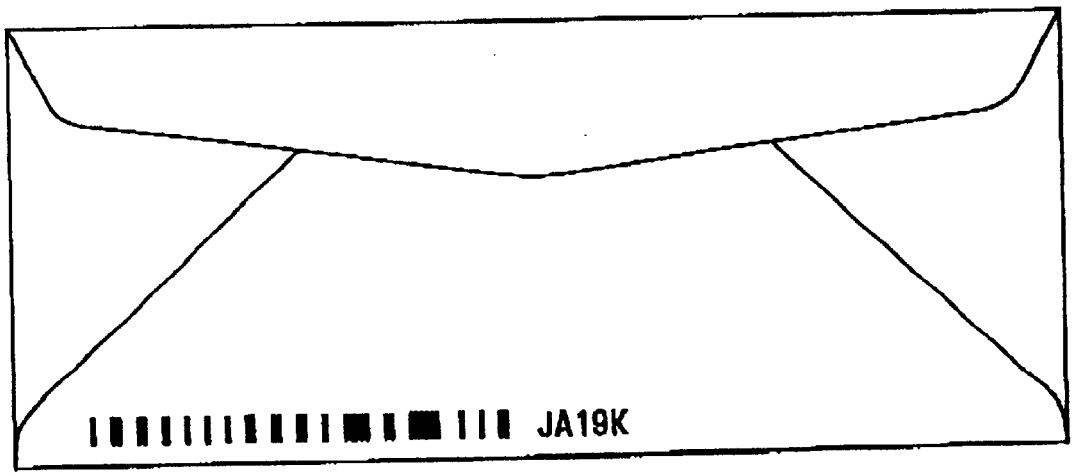
FIG. 13 is an illustration of an identification tag on the back of an envelope.

FIG. 12B is a flowchart of a process concurrently implemented by the destination mail processing apparatus to maintain the identification tags list 88. This simply consists of the steps of receiving identification tags from the national circulation database 78 and storing them in the identification tags list 88, and then subsequently deleting them from the identification tags list 88 after the mail piece is processed or after a predetermined time. In the event that a given mail processing plant contains More than one destination mail processing machine, a single message may be sent to the particular mail processing plant which then either passes or otherwise makes available this information to the individual destination mail processing apparatuses.

The above described embodiments have dealt with identifying stamps which have been stolen or reused. In order to detect stamps which have been fraudulently created or manufactured, in a preferred embodiment, the identifier bar codes include some form of data security such as encryption, for example. During the processing of mail pieces, the unique identifiers for stamps are validated in real time, by an originating mail processing apparatus for example. A bar code which cannot be decrypted or validated must not be a valid bar code, and thus mail pieces having stamps with such invalid bar codes can be sorted to a special stacker bin.

In the event that a valid bar code is simply copied, it will of course contain valid data security. However, after any stamp containing the valid bar code is used, the stamp identifier of the original stamp having the valid bar code will be deleted from the national circulation database, and as such subsequently processed stamps with the same bar code will be considered to be fraudulently produced or re-used.

In another embodiment of the invention, analysis of the data in the national database can provide historic information on customer usage of purchased stamps (philatelic versus postage), assist in forecasting volumes of mail with postage paid in stamps, and assist in inventory management. Analysis of unique identifiers and destination data can provide information on customer usage of types of stamps for international mail.

Figure 14:
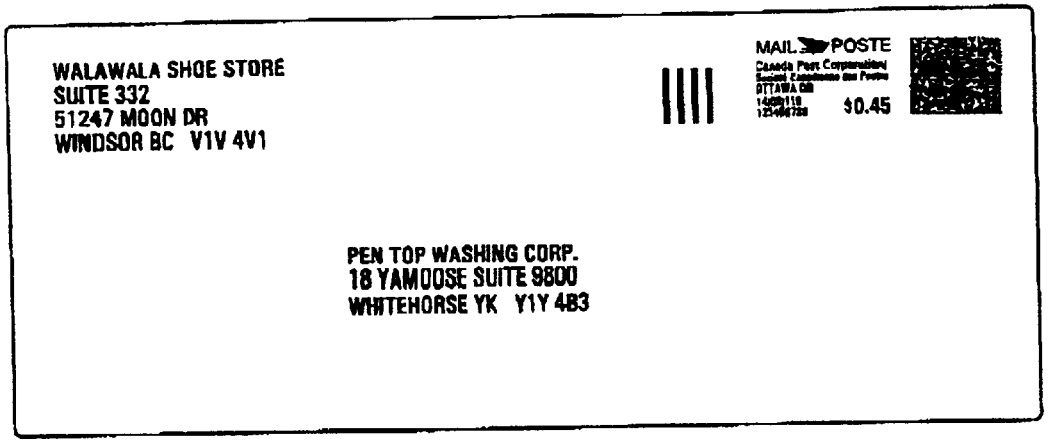
FIG. 14 is a plan view of a PC postage mail piece which can be read by mail processing apparatuses according to the inventions.
Figure 15:
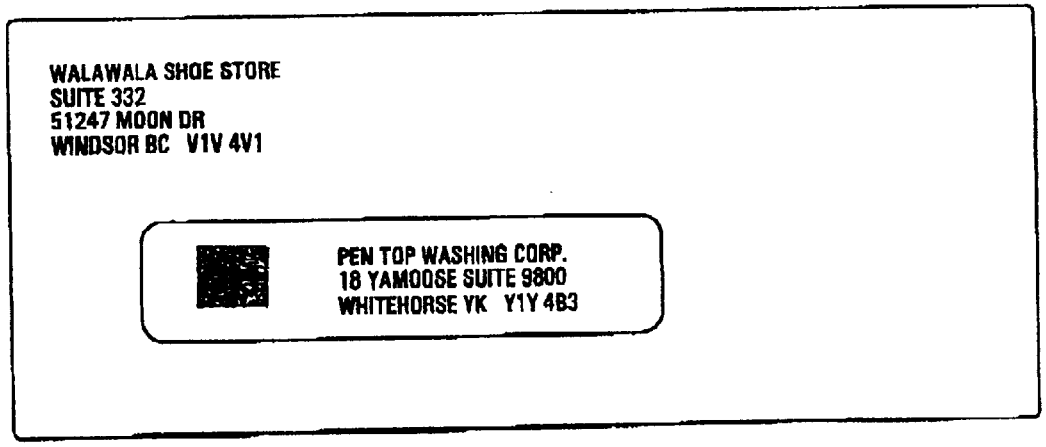
FIG. 15 is a plan view of another PC postage mail piece which can be read by mail processing apparatuses according to the invention.

In another embodiment of the invention, the mail processing methods and systems such as those described above may be used to process deliverable items having two-dimensional unique identifier bar codes such as those described above included as part of PC postage applied to the exterior of envelopes, such as depicted in FIG. 14 or applied directly on papers to be inserted in envelopes, the envelopes having windows to allow the unique identifier bar codes to be scanned without opening the envelope. An example of this is depicted in FIG. 15.

Numerous modifications and variations of the present invention are possible in light of the above teachings. It is therefore to be understood that within the scope of the appended claims, the invention may be practised otherwise than as specifically described herein.

In the above described embodiment, a destination identifier read or derived from the destination information is used to route identification tags associated with fraudulent mail pieces to the appropriate mail processing plant or other destination. Of course, the particular information forming part of the destination information which would allow this identification would depend upon the particular addressing scheme used within a given postal administration's operations or within a given delivery service provider's operations., In the above described embodiments, fluorescent one-dimensional bar codes were used as identification tags. Of course any identification tag structure or format which can uniquely identify mail pieces or deliverable items may be used.

In the above described embodiments, a mail processing apparatus has been described which includes a processing and control block which controls much of the operation of the machine. Of course, it is to be understood that this could be implemented on one or a plurality of processors, and these processors could form part of one or more computers of any appropriate type. The processing capability could be implemented in hardware or software as appropriate.

While the above embodiments have focused on delivery service providers which are postal administrations, it is to be understood that more generally they can be used by any delivery service providers in the delivery of deliverable items, in which case deliverable item processing apparatuses including the above described inventive features would be employed.

While in the above example, a single camera is provided for taking a single image of a front surface of a mail piece, more generally any image capture device may be provided for capturing one of more images of a deliverable item so long as the image(s) include the unique identifier bar codes and destination information.

While all of the above examples have included two-dimensional unique identifier bar codes, it is to be understood that for the short paid postage embodiment a one-dimensional bar code could be used since in this case the bar codes need not be unique. In this case, identifier bar codes are provided which need to at least identify the postage value of the stamp, but which may also include other information.

The embodiments of the invention in which an exclusive property or privilege is claimed are defined as follows:

1. A deliverable item processing apparatus for processing a deliverable item having destination information and having affixed thereto one or more postage stamps each having a unique identifier bar code uniquely identifying each postage stamp, each unique bar code also containing a postage value, the apparatus comprising:
   an image capture device for taking one or more images of the deliverable item which include at least the unique identifier bar codes of the postage stamps and the destination information;
   a processing and control block for processing the images so as to determine the destination information and the postage values contained in the unique identifier bar codes, for accumulating a total of the postage values contained in the unique identifier bar codes applied to the postage stamps of the deliverable item, for determining a required value for the deliverable item on the basis of the destination information, and for determining if the total is as great as the required value.

2. An apparatus according to claim 1 further comprising:
   a weighing module for determining the weight of the deliverable item, wherein the processing and control block determines the required value for the deliverable item on the basis of the weight of the deliverable item and the destination information;
   a plurality of stacker bins into which deliverable items can be diverted under control of the processing and control block, wherein the processing and control block diverts deliverable items with total postage values which are less than their required values into a particular stacker bin.

3. A deliverable item processing apparatus for processing a deliverable item having destination information and having affixed thereto one or more postage stamps each having a unique identifier bar code uniquely identifying each postage stamp, the apparatus comprising;
   an image capture device for taking one or more images of the deliverable item which include at least the unique identifier bar codes of the postage stamps and the destination information;
   an identification tag printer for applying a unique identification tag to each deliverable item processed by the deliverable item processing machine which does not already have a previously applied identification tag;
   a processing and control block for processing the images so as to determine the destination information and to determine a destination identifier from the destination information and from the unique identifier bar codes the unique identifiers, and to create a record for each postage stamp containing the unique identifier, the identification tag and the destination identifier.

4. An apparatus according to claim 3 wherein each unique identifier barcode further comprises a postage value, the processing and control block being further adapted to process the images so as to determine the postage values contained in the unique identifier bar codes, to accumulate a total of the postage values contained in the unique identifier bar codes applied to the postage stamps of the deliverable item, to determining a required value for the deliverable item on the basis of the destination information, and to determining if the total is as great as the required value.

5. An apparatus according to claim 3 further comprising:
   a weighing module for determining the weight of the deliverable item, wherein the processing and control block determines the required value for the deliverable item on the basis of the weight of the deliverable item and the destination information;
   a plurality of stacker bins into which deliverable items can be diverted under control of the processing and control block, wherein the processing and control block diverts deliverable items with total postage values which are less than their required values into a particular stacker bin.

6. An apparatus according to claim 5 wherein each deliverable item may further have applied to it an identification tag, the apparatus further comprising:
   an identification tag capture device for reading any previously applied identification tag on deliverable items;
   an input for receiving from a depository one or more identification tags of deliverable items which are to be diverted for special processing;
   wherein the processing and control block is further adapted to maintain the identification tags of deliverable items which are to be diverted for special processing, to compare the previously applied identification tag with the list of identification tags, and if there is a match, divert the deliverable item for special processing.

7. An apparatus according to claim 3 further adapted to send the record to a depository.

8. An apparatus according to claim 3 wherein each deliverable item may further have applied to it an identification tag, the apparatus further comprising:
   an identification tag capture device for reading any previously applied identification tag on deliverable items;
   an input for receiving one or more identification tags of deliverable items which are to be diverted for special processing;

wherein the processing and control block is further adapted to maintain the identification tags of deliverable items which are to be diverted for special processing, to compare the previously applied identification tag with the list of identification tags, and if there is a match, divert the deliverable item for special processing.

9. An apparatus according to claim 8 in combination with a depository adapted to process the records, the depository being adapted to process a given record by:

if the given record's unique identifier is a valid unique identifier, and if no record for the unique identifier exists, add the record to the depository.

10. An apparatus according to claim 8 in combination with a depository adapted to process the records, the depository being adapted to process a given record by:

if the given record's unique identifier is a valid unique identifier, and if no record for the unique identifier exists, add the record to the depository; and if the given record's unique identifier is an invalid unique identifier, send the given record's identification tag to a deliverable item processing apparatus of a destination associated with a destination identifier of the identification tag of the given record indicating that the deliverable item carrying that identification tag should be diverted for special processing.

11. An apparatus according to claim 8 in combination with a depository adapted to process the records, the depository being adapted to process a given record by:

if the given record's unique identifier is a valid unique identifier, and if no record for the unique identifier exists, add the record to the depository;

if the given record's unique identifier is an invalid unique identifier, send the given record's identification tag to a deliverable item processing apparatus of a destination associated with a destination identifier of the identification tag of the given record indicating that the deliverable item carrying that identification tag should be diverted for special processing;

if a record already exists for the record's unique identifier, compare the identification tag in the given record with the identification tag in the existing record, and if there is not a match, send the given record's identification tag to a deliverable item processing apparatus associated with the record's destination identifier indicating that the deliverable item carrying that identification tag should be diverted for special processing.

12. A deliverable item processing apparatus according to claim 3 wherein the unique identifier bar code is a two-dimensional unique identifier bar code representing a unique identifier, and the image of the unique identifier bar code is processed using optical character recognition.

13. A deliverable item processing apparatus for processing a deliverable item having destination information and having affixed thereto one or more postage stamps each having a unique identifier bar code representing a unique identifier, the apparatus comprising:

an image capture device for taking one or more images of the deliverable item which include at least the unique identifier bar codes of the postage stamps and the destination information;

an identification tag printer for applying a unique identification tag to each deliverable item processed by the deliverable item processing machine which does not already have a previously applied identification tag;

a processing and control system for processing the images adapted to process the images so as to determine a destination identifier from the destination information and from the unique identifier bar codes the unique identifiers, and to create a record for each postage stamp containing the unique identifier, the identification tag and the destination identifier.

14. An apparatus according to claim 13 further adapted to send the record to the depository.

15. An apparatus according to claim 14 in combination with the depository, the depository being adapted to process a given record by:

if the given record's unique identifier is a valid unique identifier, and if no record for the unique identifier exists, add the record to the depository;

if the given record's unique identifier is an invalid unique identifier, send the given record's identification tag to a deliverable item processing apparatus of a destination associated with a destination identifier of the identification tag of the given record indicating that the deliverable item carrying that identification tag should be diverted for special processing;

if a record already exists for the record's unique identifier, compare the identification tag in the given record with the identification tag in the existing record, and if there is not a match, send the given record's identification tag to a deliverable item processing apparatus associated with the record's destination identifier indicating that the deliverable item carrying that identification tag should be diverted for special processing.

16. A deliverable item processing apparatus for processing a deliverable item having an identification tag and having affixed thereto one more postage stamps having a unique identifier bar code, the apparatus comprising:

an identification tag capture device for reading the identification tag;

a processing and control block for maintaining a list of identification tags on the basis of an input received from a remote source, for comparing the identification tag with the list of identification tags, and if there is a match, diverting the deliverable item for special processing.

* * * * *

UNITED STATES PATENT AND TRADEMARK OFFICE
CERTIFICATE OF CORRECTION

PATENT NO.     : 6,398,106 B1
DATED          : June 4, 2002
INVENTOR(S)    : Joseph Frank Ulvr et al.

It is certified that error appears in the above-identified patent and that said Letters Patent is hereby corrected as shown below:

<u>Title page, Item [54] and Column 1, line 1,</u>
Change "BARS" to -- BAR CODES --

<u>Column 9,</u>
Line 28, change "circulation database 18" to -- circulation database 78 --

<u>Column 12,</u>
Line 31, change "according to claim 3" to -- according to claim 4 --

Signed and Sealed this

Eighth Day of April, 2003

JAMES E. ROGAN
*Director of the United States Patent and Trademark Office*